United States Patent
Tsui

(12) 
(10) Patent No.: US 6,206,978 B1
(45) Date of Patent: Mar. 27, 2001

(54) PROCESS FOR CLEANING AQUARIUM TANK WALLS

(75) Inventor: Jeff Wen Chieh Tsui, Walnut, CA (US)

(73) Assignee: Roger Williams General Hospital, Providence, RI (US)

( * ) Notice: Subject to any disclaimer, the term of this patent is extended or adjusted under 35 U.S.C. 154(b) by 0 days.

(21) Appl. No.: 09/460,098

(22) Filed: Dec. 13, 1999

(51) Int. Cl.[7] ........................................................ B08B 9/04
(52) U.S. Cl. ..................... 134/8; 134/6; 134/22.1; 134/42; 15/220.2; 119/245; 119/264
(58) Field of Search ........................ 134/6, 8, 22.1, 134/42; 15/220.2; 119/245, 264

(56) References Cited

U.S. PATENT DOCUMENTS

| | | | |
|---|---|---|---|
| 2,507,559 | 5/1950 | D'Andrea | 15/220 |
| 2,518,758 | 8/1950 | Cook | 259/108 |
| 2,634,444 | 4/1953 | Coleman | 15/121 |
| 3,208,090 | 9/1965 | Roesel, Jr. | 15/220 |
| 4,921,614 * | 5/1990 | Frickman et al. | 210/695 |
| 5,515,570 * | 5/1996 | Muscroft | 15/220.2 |
| 5,988,109 * | 11/1999 | Rofen | 119/245 |

FOREIGN PATENT DOCUMENTS

| | | | |
|---|---|---|---|
| 2042148 * | 12/1971 | (DE) | . |
| 3630324 * | 5/1988 | (DE) | . |
| 2105977 * | 4/1983 | (GB) | . |
| 406142013 * | 5/1994 | (JP) | . |

* cited by examiner

Primary Examiner—S. Carrillo
(74) Attorney, Agent, or Firm—John P. White; Cooper & Dunham LLP

(57) ABSTRACT

A process for using a magnetic aquarium tank wall cleaning tool for cleaning the inner surface of an aquarium having one or more curved interior vertical corners. Magnetic cleaners for aquariums eliminate the need for reaching into the tank or manipulating a cleaner with a long handle. The magnetic tank wall cleaning tool has at least one edge which is curved. The radius of curvature is no more than the radius of curvature of the inner surface of the tank to be cleaned. The cleaner can be manipulated from one flat surface around a curved interior corner by moving the handle horizontally around the corner.

1 Claim, 2 Drawing Sheets

U.S. Patent	Mar. 27, 2001	Sheet 1 of 2	US 6,206,978 B1
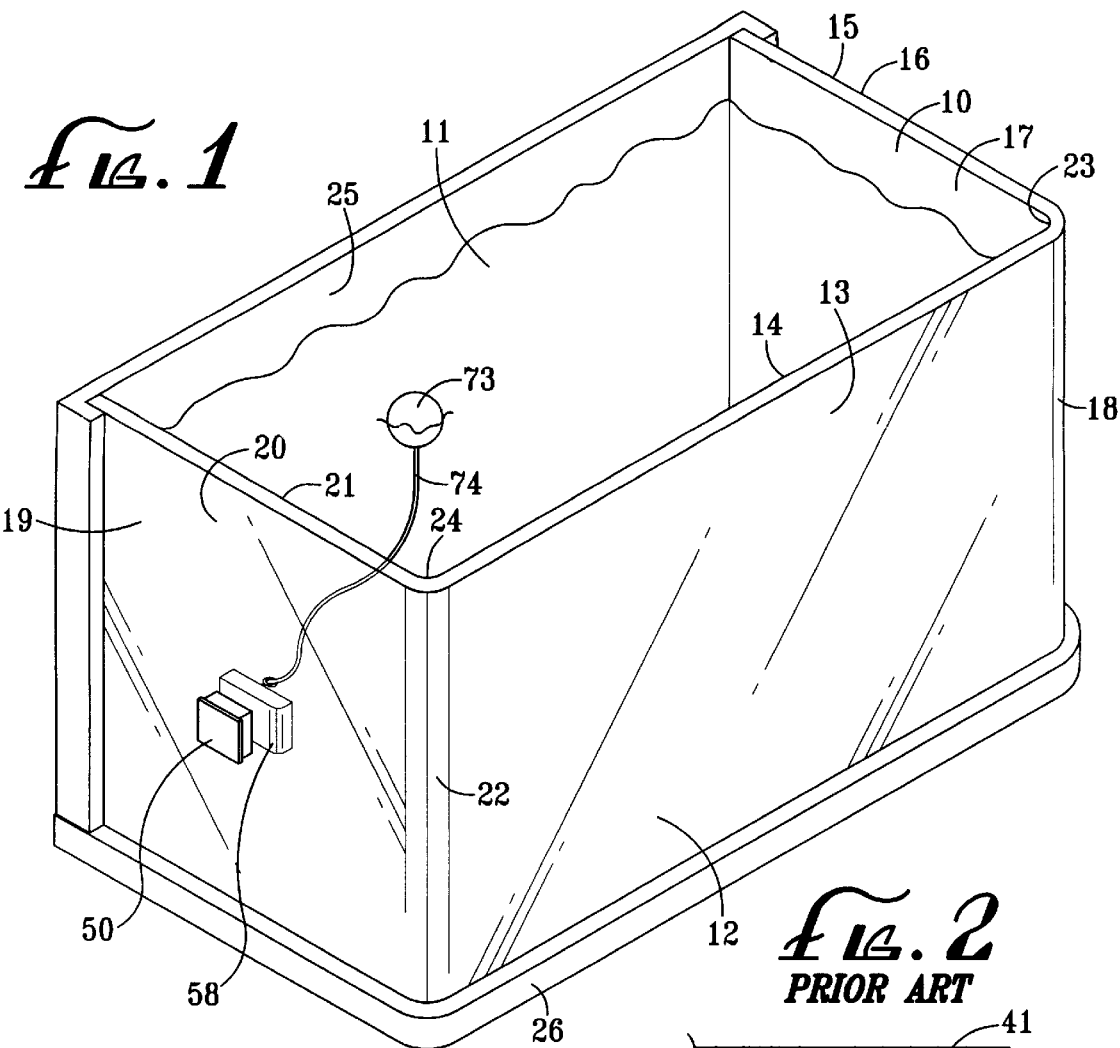
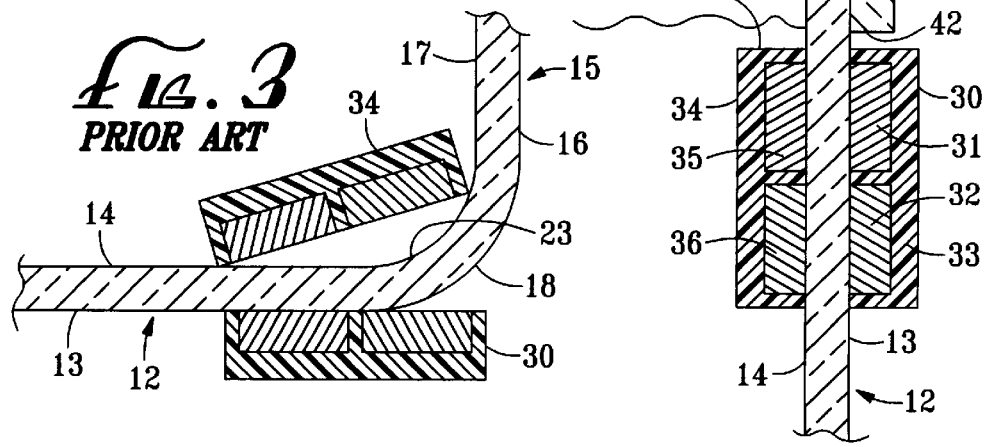

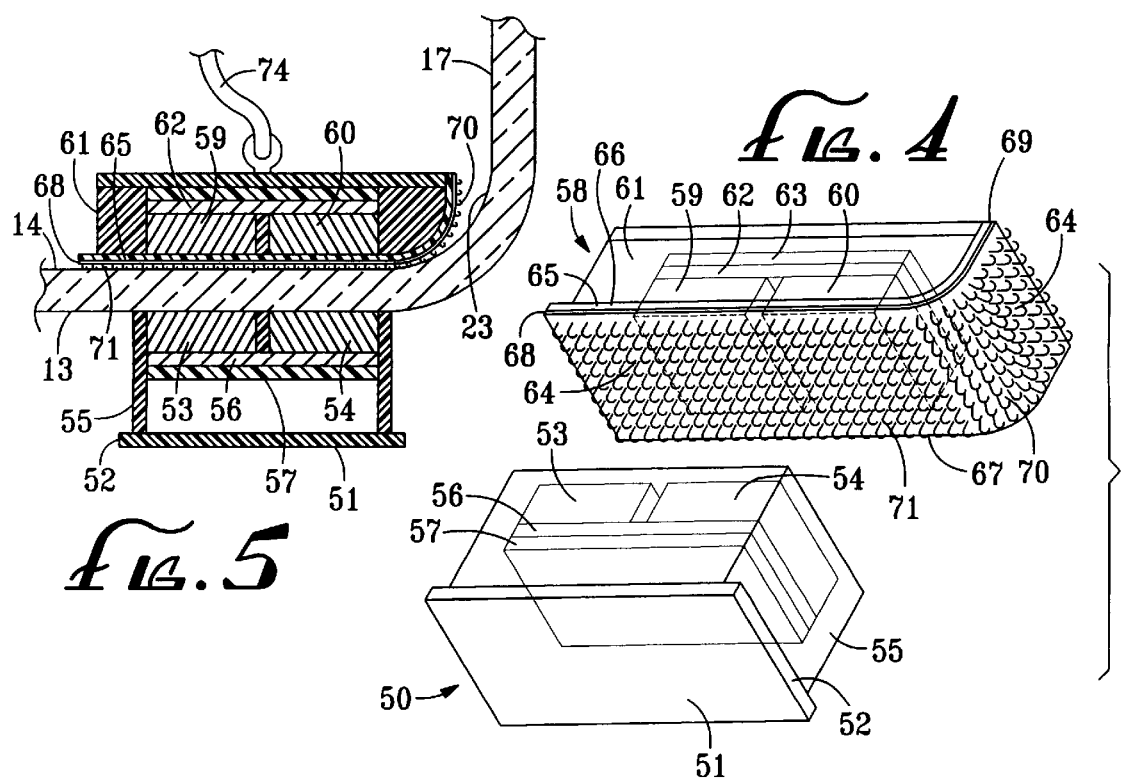
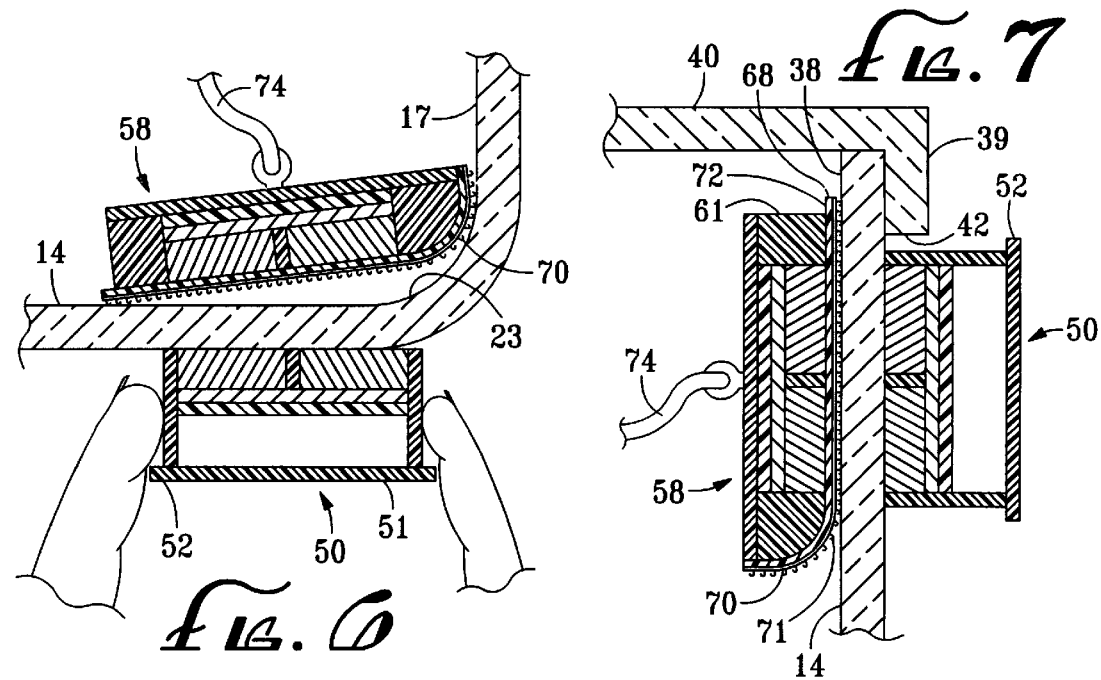

PROCESS FOR CLEANING AQUARIUM TANK WALLS

BACKGROUND OF THE INVENTION

The field of the invention is aquarium care products and the invention relates more particularly to magnetic aquarium cleaners utilizing a handle portion which has a magnet on the outer surface of the aquarium and a cleaner portion which also has a magnet which is attracted to the handle portion.

A magnetic aquarium cleaner is shown in U.S. Pat. No. 3,208,090. This cleaner has a motive or controller member 6 which moves a moving or follower member 5. The motive member is manipulated on the outside of the aquarium and the follower member rides along the inner surface of the aquarium wall. The follower is generally rectangular in shape and has two sponges along each edge. While such device is adequate for old style aquariums of the type having flat glass walls, such flat pads are not capable of cleaning the curved inner surface of modern aquariums made of plexiglass.

Window cleaners have been used which also utilize magnets and one such window cleaner is shown in U.S. Pat. No. 2,507,559. The magnets used are cylindrical and wrapped in a rectangular pouch 15.

Another magnetic window cleaning device is shown in U.S. Pat. No. 2,634,444. In this case, a rectangular magnet is used and the magnet is wrapped with a cleaning material.

A magnetic stirring apparatus is shown in U.S. Pat. No. 2,518,758. The stirrer is rotated by a rotating magnet held below the base of the flask.

The problem that exists is two fold. The inner curved corners are very difficult to clean without putting one's hand and arm inside the fish tank. Because of the potential for transferring germs to or from the aquarium water, this is not desirable. If all the algae is not removed, it quickly forms a nucleus for new hard algae growth. Also, many fish tanks have a canopy which extends over the outer top edge of the tank. The classic magnetic cleaners follow the exterior handle and thus, are not able to reach beyond the overhang of the canopy. Since this leaves a layer of algae, it again forms a nucleus for further algae growth.

BRIEF SUMMARY OF THE INVENTION

It is an object of the present invention to provide a magnetic cleaner for a fish tank which is capable of cleaning both the inner curved surface of a curved corner and the inner surface of an aquarium covered by the exterior flange of a canopy.

The present invention is for an aquarium tank inner wall cleaning tool having an outer wall magnet-containing handle and an inner wall magnet-containing cleaner. The improvement of the present invention comprises a curved edge on the wall-contacting face of the cleaner. Preferably, the wall-contacting face has a rigid, generally rectangular face with a top edge, a bottom edge, a first edge wherein the first edge has an extension, and a second edge wherein the second edge has an arcuate curve and the wall-contacting face is covered with a deformable cleaning pad. The deformable cleaning pad is preferably made from the hook portion of a hook and loop fastening assembly. The wall-contacting face of the cleaner is preferably larger than the tank-contacting face of the handle. Also, preferably the first edge of the cleaner extends past the rectangular body of the cleaner.

The present invention also comprises a process for cleaning an interior surface of an aquarium tank which has at least one curved vertical corner. The steps include placing an outer wall magnet-containing handle against an area of the outer surface of the vertical wall of the aquarium. Next, an inner wall magnet-containing cleaner is moved against an area of the inner surface of a vertical wall of the aquarium adjacent the handle so that the magnet in the handle attracts the magnet in the cleaner. The cleaner has a curved edge having a radius of curvature no more than the radius of curvature of the curved inner surface of the aquarium to be cleaned. Next, the curved edge of the cleaner is aligned with the curved inner surface of the aquarium and the handle is moved vertically up and down so that the curved edge rides along the curved inner surface of the aquarium and cleans the curved inner surface. The process also includes steps which permit the cleaner to be moved from one flat inner surface to an adjacent flat inner surface. This comprises the steps of moving the handle along the inner edge of one of the flat surfaces in a generally horizontal direction and orienting the handle so that a curved edge of the cleaner is vertically aligned with the inner curved edge of the aquarium. Next, the handle is moved around the outer surface of the corner and because of the curved edge of the cleaner, the cleaner is never separated from the handle enough so that the force of attraction between the magnet of the cleaner and the magnet of the handle holds the cleaner as it goes around the curved corner.

BRIEF DESCRIPTION OF THE DRAWINGS

FIG. 1 is a perspective view of an aquarium, including an aquarium tank having two vertical curved corners.

FIG. 2 is a side cross-sectional view of a prior art magnet aquarium cleaning tool.

FIG. 3 is a top cross-sectional view analogous to FIG. 2 showing the prior art cleaning tool at the curved vertical corner of the aquarium tank of FIG. 1.

FIG. 4 is an exploded perspective view of the magnet cleaning tool of the present invention.

FIG. 5 is a top cross-sectional view of the magnetic cleaning tool of the present invention.

FIG. 6 is a top cross-sectional view of the magnetic cleaning tool of the present invention being manipulated around the curved vertical corner of the aquarium tank of FIG. 1.

FIG. 7 is a side cross-sectional view of the magnetic cleaning tool of the present invention adjacent a canopy having a flange which overhangs an upper edge of an aquarium wall.

DESCRIPTION OF THE PREFERRED EMBODIMENTS

An aquarium tank is shown in perspective view in FIG. 1 and indicated generally by reference character 10. Aquarium tank 10 holds a body of water 11 which typically not only contains fish, but various decorations and plants not shown. Tank 10 has a flat front wall 12 with an outer surface 13 and an inner surface 14. Tank 10 has a right side wall 15 with an outer surface 16 and an inner surface 17.

A curved vertical corner 18 is formed between front wall 12 and right side wall 15. Such curved corners provide a far more attractive view from the exterior of the aquarium as compared to the metal bracket commonly used in glass aquariums made from flat glass plates. Such brackets obscure the view of the interior of the aquarium, whereas the curved vertical corner 18 permits viewing through the corner, thereby providing a far more attractive appearance.

Left side wall 19 has an outer surface 20 and an inner surface 21. Left side wall 19 and front wall 12 are connected by curved vertical corner 22 which also permits the viewing of the interior through the curved corner.

Curved vertical corner 18 has a curved inner surface 23. Curved vertical corner 22 has a curved inner surface 24. The tank also has a back 25 and a bottom generally indicated as 26.

The inner wall surfaces become fouled with hard and hair algae and other deposits such as calcium deposits and need to be cleaned in order to provide an attractive aquarium. Because of the importance of maintaining the fish in a disease-free environment, all practical steps are taken to keep the water free from germs. For this reason, it is appropriate to not place one's hand and arm into an aquarium to clean the inner surfaces. Thus, various cleaning mechanisms have been devised which permit the owner to clean the inner surfaces without contaminating the water. One such system is indicated in FIGS. 2 and 3 of the drawings where a magnet wall-cleaning assembly is shown. As shown in FIG. 2, a handle portion 30 holds a pair of magnets 31 and 32 in a rectangular plastic case 33. Handle portion 30 is placed against the outer surface 13 of front wall 12. A cleaner portion 34 also has a pair of magnets 35 and 36 held in a rectangular plastic case 37. The handle portion 30 and the cleaner portion 34 are typically the same size which makes it difficult to clean an upper portion 38 of inner surface 14 because the flange 39 of canopy 40 overhangs the top 41 of front wall 12. Thus, handle portion 30 is prevented from being raised above the base 42 of flange 39. Because of this, the cleaner portion 34 is unable to remove algae from upper portion 38. Because this portion of the algae remains after cleaning, it readily provides a nucleus for the return growth of algae, making the need for cleaning more frequent.

Another disadvantage of the same shaped rectangular magnet assembly of FIG. 2 is indicated in FIG. 3 of the drawings. There, the curved vertical corner 18 has a curved inner surface 23 which the rectangular cleaner portion 34 is unable to properly clean. Also, in attempting to go from the cleaning of the inner surface 14 of front wall 12 to the cleaning of the inner surface 17 of right side wall 15, one moves the magnet assembly to a position such as that shown in FIG. 3. The further movement of handle portion 30 around curved vertical corner 18 causes the two magnet assemblies to move so far apart that the handle portion is no longer able to magnetically attract the cleaner portion, which then falls to the bottom of the tank. Thus, in practice, one needs to go through the trouble of removing cover 40, disassembling the magnet assembly from its position around front wall 12 and reassembling it around right side wall 15. This simply adds to the time and inconvenience of cleaning the inner surfaces.

The aquarium inner wall-cleaning tool assembly of the present invention is shown in FIGS. 4 through 7. In FIG. 4 the handle portion 50 has a top 51 with an overhanging edge 52 which facilitates the grasping of handle portion 50. A pair of magnets 53 and 54 are held within a rectangular wall portion 55. A metal plate 56 is positioned behind magnets 53 and 54 and held in position by a spacer 57 within the rectangular wall portion 55.

The cleaner 58 also has a pair of magnets 59 and 60 held in a rectangular wall portion 61. A metal plate 62 is positioned behind the magnets to increase their magnetic force and the magnet assembly is held within the rectangular wall portion by spacer 63. Cleaner 58 has a wall-contacting face 64 which is generally rectangular when viewed normal to wall-contacting face 64.

Wall-contacting face 64 is made up of a rigid sheet of plastic 65 which has a top edge 66, a bottom edge 67, a first edge 68 and a second edge 69. Second edge 69 includes a curved face 70 which provides numerous advantages.

As shown best in FIG. 5, curved face 70 can be placed adjacent curved inner surface 23 and moved vertically to easily clean this curved inner surface. Preferably, the rigid sheet 65 has a cleaning surface on wall-contacting face 64. One such effective surface is the hooked portion of a hook and loop fastener of the type sold under the trademark "Velcro." This cleaning surface is indicated by reference character 71.

The movement of the cleaner 58 from contact with inner wall 14 to contact with inner wall 17 is facilitated by the existence of curved face 70. It can be seen by viewing FIG. 6 that if curved face 70 formed a right angle, the cleaner 58 would be further from handle 50 than it is by the use of a curved face. The cleaner may be moved from surface 14 to surface 17 by moving handle 50 around the outer edge of curved vertical corner 23 with the curved face leading the turn of the cleaner. This makes the cleaning of the inner surface of the tank easier since it eliminates the necessity of disassembling the two portions of the magnetic cleaner to go from one inner face to an adjacent inner face. Preferably, the radius of curvature of curved face 70 is the same as the radius of the curvature of the tank. In some cases, it is possible that the radius of curvature of curved face 70 is smaller than the radius of curvature of the inner corner 23. This still permits the cleaning of the inner corner with far greater ease than that possible with the rectangular prior art magnetic cleaner shown in FIGS. 2 and 3.

Preferably, the handle portion includes a cloth tank-contacting surface. A preferred type of magnet is a grade 8 ceramic magnet or a rare earth magnet ¾" to 1" thick. The magnet assembly of the present invention is also useful for hexagonal corners and corners other than curved corners which are not readily cleaned by the prior art rectangular assembly.

As shown in FIG. 7, more of the upper portion 38 of inner surface 14 may be cleaned with the magnetic cleaning assembly of the present invention for two reasons. First, the cleaner is larger than the handle and thus, extends beyond the handle into upper portion 38. Secondly, first edge 68 includes an extension 72 which extends past rectangular wall portion 61 which further extends the cleaning area of the cleaner 58. The result is a magnetic cleaning assembly which greatly facilitates the cleaning of the interior of a fish tank, and especially of a fish tank having one or more curved inner corners.

As shown in FIG. 1, the cleaning assembly further includes a float 73 affixed to a flexible line 74 tied to cleaner 58. In the event the cleaner falls to the bottom of the tank, the float facilitates the recovery of the cleaner without having to reach into the tank.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A process for cleaning an inner surface of an aquarium tank which has at least one curved vertical corner, said aquarium tank having a base, a vertical wall assembly having at least a first flat surface and a second adjacent flat surface surrounding said curved vertical corner, wherein each of said flat surfaces comprises an outer surface and an inner surface and said curved vertical corner having a curved inner surface having a radius of curvature, said process comprising:

placing an outer wall magnet-containing handle against an area of said outer surface of said first flat surface of said vertical wall assembly;

placing an inner wall magnet-containing cleaner against an area of said inner surface of said first flat surface of said vertical wall assembly, said inner wall magnet-containing cleaner being adjacent to said outer wall magnet-containing handle so that the magnet in said handle attracts the magnet of said inner wall magnet-containing cleaner and said inner wall magnet-containing cleaner having a curved edge having a radius of curvature no more than the radius of curvature of said curved inner surface of said curved vertical corner;

moving the outer wall magnet-containing handle along said outer surface of said first flat surface of said vertical wall assembly in a horizontal direction towards said curved vertical corner while moving said inner wall magnet containing cleaner towards the curved inner surface of said curved vertical corner;

aligning said curved edge of said inner wall magnet-containing cleaner with the curved inner surface of said curved vertical corner so that the curved edge of said inner wall magnet-containing cleaner touches the curved inner surface of said curved vertical corner;

grasping the outer wall magnet-containing handle and moving said outer wall magnet-containing handle in a vertical direction so that the curved edge of said inner wall magnet-containing cleaner rides along the curved inner surface and cleans the curved inner surface of the curved vertical corner of the aquarium tank; and moving the outer wall magnet-containing handle in a horizontal direction around said curved vertical corner to said second adjacent flat surface of said vertical wall assembly, while moving the inner wall magnet-containing cleaner around the curved inner surface of said curved vertical corner to said inner surface of said second adjacent flat surface of said vertical wall assembly.

* * * * *

UNITED STATES PATENT AND TRADEMARK OFFICE
CERTIFICATE OF CORRECTION

PATENT NO. : 6,206,978 B1  
DATED : March 27, 2001  
INVENTOR(S) : Jeff Wen Chieh Tsui Page 1 of 1

It is certified that error appears in the above-identified patent and that said Letters Patent is hereby corrected as shown below:

Item No. (73) Delete the named assignee - patent has not been assigned  
Item No. (74) Delete the named attorney, agent or firm and insert --  
Edgar W. Averill, Jr. --

Signed and Sealed this

Eighteenth Day of September, 2001

Attest:

*Nicholas P. Godici*

NICHOLAS P. GODICI  
*Attesting Officer*     *Acting Director of the United States Patent and Trademark Office*